United States Patent Office 3,152,101
Patented Oct. 6, 1964

3,152,101
HYDRAZIDE STABILIZATION OF OXY-
METHYLENE COPOLYMERS
Thomas J. Dolce, Summit, N.J., assignor to Celanese
Corporation of America, New York, N.Y., a corporation of Delaware
No Drawing. Filed July 10, 1959, Ser. No. 826,115
6 Claims. (Cl. 260—45.9)

This invention relates to polymers which are structurally related to polyoxymethylene and particularly to polymers of high thermal stability. This invention also relates to a method for improving the thermal stability and particularly the initial thermal stability of polymers.

Polyoxymethylene polymers, having recurring

—CH$_2$O— units have been known for many years. They may be prepared by the polymerization of anhydrous formaldehyde or by the polymerization of trioxane which is a cylic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes wtih organic compounds, as described in application Serial No. 691,143, now Patent No. 2,989,506, filed October 21, 1957, by Donald E. Hudgin and Frank M. Berardinelli. Boron fluoride gas is also a rapid and effective catalyst, as disclosed in application Serial No. 691,144, now Patent No. 2,989,507, also October 21, 1957, by Hudgin and Berardinelli.

Although polyoxymethylenes prepared by some methods are much more stable against thermal degradation than those prepared by other methods, it is nevertheless desirable for many uses that the thermal stability be increased.

Various chemical stabilizers have been utilized successfully in reducing the thermal degradation rate of oxymethylene polymers and it has been possible to stabilize such polymers so that their degradation rate (222° C.) is less than about 0.1 weight percent per minute for most of the polymer mass when the polymer is maintained in an open vessel in a circulating air oven at 222° C. However, despite this high stability for most of the polymer mass, it has been difficult to reduce the initial degradation rate of the polymer (at 222° C. in air) to a satisfactory level.

Reduction of the degradation rate during the initial degradation period is important if molded products of even surface charatceristics are to be produced. Molding processes involve heating for comparatively short periods and the gassing during the molding period is reflected as the initial degradation in the degradation test.

It is an object of this invention to provide a method for reducing the initial degradation (at 222° C. in air) of oxymethylene polymers.

In accordance with this invention it has been found that there is excellent initial degradation stability in an admixture of a polyhydrazide of a polycarboxylic acid with a solid copolymer containing oxymethylene units and oxyalkylene units having more than one carbon atom, and particularly copolymers containing from 60 to 99.6 mol percent of recurring oxymethylene units. Dihydrazides of dicarboxylic acids are preferred.

The admixture of a dihydrazide of a dicarboxylic acid with an oxymethylene homopolymer produces a product of improved thermal stability but not a product of the same order of stability as the products of this invention.

It appears that the susceptibility of polyoxymethylene polymers to stabilization by the addition of the dihydrazides is enhanced by incorporating into the polymer oxyalkylene units derived from cyclic ethers having at least two adjacent carbon atoms.

Among the copolymers which are utilized in accordance with this invention are those having a structure comprising recurring units having the formula

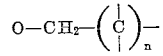

wherein $n$ is an integer from zero to 5 and wherein $n$ is zero in from 60 to 99.6 percent of the recurring units.

A preferred class of copolymers are those having a structure comprising recurring units having the formula (—O—CH$_2$—(CH$_2$)$_n$—) wherein $n$ is an integer from zero to 2 and wherein $n$ is zero in from 60 to 99.6 percent of recurring units. These copolymers are prepared by copolymerizing trioxane with a cyclic ether having the structure

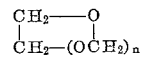

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom.

The coordinate complexes of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl-phenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In a specific embodiment of this invention, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ether in accordance with this invention have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in copending application S. No. 718,147, now Patent No. 2,989,509, filed February 28, 1958, by Donald E. Hudgin and Frank M. Berardinelli.

The dihydrazides which may be used in accordance with the preferred aspect of this invention may be represented by the formula

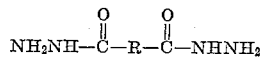

where R is a divalent organic radical, such as an alkylene radical, arylene radical, alkarylene radical, aralkylene radical, a divalent alicyclic radical or a divalent heterocyclic radical. The preferred dihydrazides are those of the aliphatic dicarboxylic acids having from 3 to 10 carbon atoms, and particularly those of the straight chain acids such as sebacic, azelaic, pimelic, glutaric, adipic and suberic acids.

Other suitable polyhydrazides include the dihydrazide of phenylene dibutyric acid, the dihydrazide of phenylene diacetic acid and the trihydrazide of trimellitic acid.

In a preferred embodiment of this invention the polymer composition also contains an alkylene bisphenol as a thermal stabilizer, as disclosed in my copending application Serial No. 792,280, filed February 10, 1959. A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenol is 2,2'-methylene-bis(4-methyl-6-tertiary butyl phenol).

It has been found in accordance with this invention that although alkylene bisphenols are effective in reducing the general degradation level of oxymethylene copolymers, the polyhydrazides are more effective in reducing initial degradation and a mixture of the two is more effective than a comparable amount of either class of stabilizer, by itself.

The polyhydrazide is generally admixed with the copolymer in amounts not exceeding 2%, based on the weight of the copolymer, and preferably in amounts between about 0.5 and 2 weight percent. The alkylene bisphenol, when used, is admixed in amounts not exceeding 2 weight percent and preferably from about 0.5 to about 2 weight percent.

The polyhydrazides, and the alkylene bisphenols, if desired, may be admixed intimately with the polymer by being applied in solution to the finely divided solid polymer followed by evaporation of the solvent. Diethyl ether is an excellent solvent for this purpose. The admixture may also be made by dry blending the finely divided polymer and finely divided stabilizers, by milling the stabilizers into the polymer as the latter is worked on a rubber mill or by dissolving the polymer and the stabilizers into a common solvent, such as gamma butyrolactone, and evaporating the solvent.

The compositions of this invention may also include, if desired, plasticizers, fillers, pigments and other stabilizers, such as stabilizers against degradation caused by ultra violet light.

EXAMPLE I

Into a 5 liter 3-neck flask fitted with a mechanical stirrer, a thermometer and a condenser were placed 1960 g. of molten and filtered trioxane, 840 g. Marlex grade cyclohexane and 49 g. distilled dioxolane (2.5% based on the trioxane). This mixture was heated to 60° C. to complete solution. Then 0.60 ml. of BF$_3$-dibutyletherate in 15 ml. of cyclohexane was added (0.021% based on total charge). The solution became cloudy and was stirred for 4 min. and poured into a jacketed Readco mixer (sigma blade type). There the reaction was run for 1 hr. 19 min. after catalyst addition, then the contents were placed in 3 liters of acetone containing 5 ml. of tributylamine. The polymer was washed with this solution, filtered and washed twice more with acetone. It was then dried at 65–70° C. overnight in an oven. The yield was 1340 g. (67%) and the inherent viscosity 1.66.

The copolymer contained 3.7 weight percent of monomeric units derived from dioxolane. Its degradation rate without stabilizers (at 222° C. in air) was a steady 1.5 weight percent/min.

EXAMPLE II

Three grams of the above described copolymer was slurried with a solution of 0.06 grams (2 weight percent, based on the polymer) of sebacic dihydrazide in 15–20 ml. of hot methanol. The solvent was slowly evaporated with occasional stirring and the polymer was dried at 65–70° C. for about an hour. A disc was compression molded from this polymer at 190° C. for 4 minutes at a pressure of 1500 p.s.i. The degradation rate (at 222° C. in air) was determined in an open vessel in a circulating air oven and is shown in Table I, below.

EXAMPLE III

A copolymer, substantially similar to that of Example I and having substantially the same dioxolane content but having a steady degradation rate of 1.3 weight percent/min. in raw state, was treated as in Example II to incorporate 2 weight percent of stabilizer. The stabilizer in this case was 2,2'-methylene-bis-(4-methyl-6-tertiary butyl phenol) rather than sebacic dihydrazide. The degradation rate, determined on a compression molded disc as described in Example II is shown in Table I, below.

EXAMPLE IV

Example III was repeated except that the stabilizer incorporated was 1 weight percent of 2,2'-methylene-bis-(4 methyl-6-tertiary butyl phenol) and 1 weight percent of sebacic dihydrazide. The degradation rate is shown below.

EXAMPLE V

The combination of stabilizers utilized in Example IV was incorporated (at the same levels) into an oxymethylene homopolymer having a steady degradation rate of 1.7 weight percent/min. The degradation rate, determined as described above is shown in Table I.

Table I
DEGRADATION RATE
[Wt. percent/min. at 222° C. in air]

| Stabilizer | Homo-polymer, percent | Copolymer |
| --- | --- | --- |
| None | 1.7 | 1.5% (Example II) and 1.3% (Examples III and IV). |
| 2% Dihydrazide | | <0.49 (first 4.5%); 0.1 (remainder). |
| 2% Bisphenol | | <0.95 (first 9.5%); 0.1 (remainder). |
| 1% Dihydrazide+1% Bisphenol | 1.1 | <0.1 (from beginning). |

It is to be understood that the foregoing detailed description is merely given by way of illustration and that many variations may be made therein without departing from the spirit of my invention.

Having described my invention, what I desire to secure by Letters Patent is:

1. An admixture of a stabilizing amount of a dihydrazide of a dicarboxylic acid and a stabilizing amount of an alkylene bisphenol with a copolymer containing oxymethylene units and oxyalkylene units having more than one carbon atom, said copolymer containing from 60 to 99.6 mol percent of recurring oxymethylene units, said stabilizing amount being an amount not exceeding 2%, based on the weight of the copolymer and said dihydrazide being of the formula

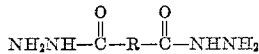

where R is a divalent organic radical of the group consisting of alkylene radicals, arylene radicals, alkarylene radicals, aralkylene radicals, divalent alicyclic radicals and divalent heterocyclic radicals and said alkylene bisphenol having 1 to 4 carbon atoms in the alkylene group and having from 0 to 2 alkyl substituents on each benzene ring, each alkyl substituent having from 1 to 4 carbon atoms.

2. An admixture of a stabilizing amount of dihydrazide of a dicarboxylic acid and a stabilizing amount of an alkylene bisphenol with a copolymer containing oxymethylene units and oxyalkylene units having more than one carbon atom, said copolymer containing from 60 to 99.6 mol percent of recurring oxymethylene units, said alkylene bisphenol having 1 to 4 carbon atoms in the alkylene group and having from 0 to 2 alkyl substituents on each benzene ring, each alkyl substituent having from 1 to 4 carbon atoms.

3. An admixture of a stabilizing amount of a dihydrazide of a dicarboxylic acid and a stabilizing amount of an alkylene bisphenol with a copolymer containing oxymethylene units and oxyalkylene units having more than one carbon atom, said copolymer containing from 60 to 99.6 mol percent of recurring oxymethylene units, said stabilizing amount of dihydrazide being an amount not exceeding 2%, based on the weight of copolymer, said stabilizing amount of bisphenol being an amount not exceeding 2%, based on the weight of copolymer, said alkylene bisphenol having 1 to 4 carbon atoms in the alkylene group and having from 0 to 2 alkyl substituents on each benzene ring, each alkyl substituent having from 1 to 4 carbon atoms.

4. An admixture of a stabilizing amount of a dihydrazide of a straight chain dicarboxylic acid having from 3 to 10 carbon atoms and a stabilizing amount of an alkylene bisphenol having from zero to 2 alkyl substituents each having from 1 to 4 carbon atoms, with a copolymer comprising recurring units having the formula ($-O-CH_2(CH_2)_n-$) wherein $n$ is an interger from zero to 2 and wherein $n$ is zero in from 60 to 99.6 percent of recurring units.

5. An admixture of a stabilizing amount of a dihydrazide of a straight chain dicarboxylic acid having from 3 to 10 carbon atoms and a stabilizing amount of 2,2'-methylene-bis-(4 methyl-6-tertiary butyl phenol) with a copolymer of trioxane and 1,3-dioxolane, said copolymer containing from 60 to 99.6 mol percent of recurring oxymethylene units.

6. An admixture of a dihydrazide of a straight chain dicarboxylic acid having from 3 to 10 carbon atoms and 2,2'-methylene-bis-(4 methyl-6-tertiary butyl phenol) with a copolymer of trioxane and 1,3-dioxolane, said copolymer containing from 60 to 99.6 mol percent of recurring oxymethylene units, said polyhydrazide being present in an amount between about 0.5% and 2% and said bisphenol being present in an amount between 0.5% and 2% both based on the weight of copolymer.

References Cited in the file of this patent
UNITED STATES PATENTS

| | | |
| --- | --- | --- |
| 2,376,354 | Gresham | May 22, 1945 |
| 2,395,265 | Gresham | Feb. 19, 1946 |
| 2,475,610 | Gresham et al. | July 12, 1949 |

FOREIGN PATENTS

| | | |
| --- | --- | --- |
| 748,856 | Great Britain | May 9, 1956 |